Oct. 19, 1948.  C. D. SCHERMULY ET AL  2,451,981
ROCKET AND THE LIKE
Filed May 5, 1947  2 Sheets-Sheet 1

INVENTORS
CONRAD DAVID SCHERMULY
ALFRED JAMES SCHERMULY
CHARLES SCHERMULY
By their attorneys
Howson and Howson Oct. 19, 1948. C. D. SCHERMULY ET AL 2,451,981
ROCKET AND THE LIKE
Filed May 5, 1947 2 Sheets-Sheet 2

INVENTORS
CONRAD DAVID SCHERMULY
ALFRED JAMES SCHERMULY
CHARLES SCHERMULY
By their attorneys
Howson and Howson Patented Oct. 19, 1948

2,451,981

UNITED STATES PATENT OFFICE 2,451,981

ROCKET AND THE LIKE

Conrad David Schermuly, Alfred James Schermuly, and Charles Schermuly, Parkgate, Newdigate, England Application May 5, 1947, Serial No. 745,967
In Great Britain August 10, 1939

Section 1, Public Law 690, August 8, 1946
Patent expires August 10, 1959

9 Claims. (Cl. 102—34.5)

This invention relates to rockets and the like and has for its principal object to provide a rocket having a greater range than those hitherto in use and which is simple in construction and compact in form.

The rocket device according to this invention comprises a single rocket adapted to be fired from a rocket discharger such as a pistol or gun, a plurality of additional rockets arranged forwardly of the single rocket and an intermediate member by which a container for the additional rockets is secured to the single rocket, the said intermediate member comprising a sleeve and a disc, the sleeve being secured to the single rocket and having a central aperture and the disc being secured to the container for the additional rockets and having a central aperture and also a number of further apertures corresponding to the number of additional rockets, the sleeve and disc being secured to each other by suitable webs in which is provided a passage connecting the central apertures in the sleeve and disc.

Figure 1:
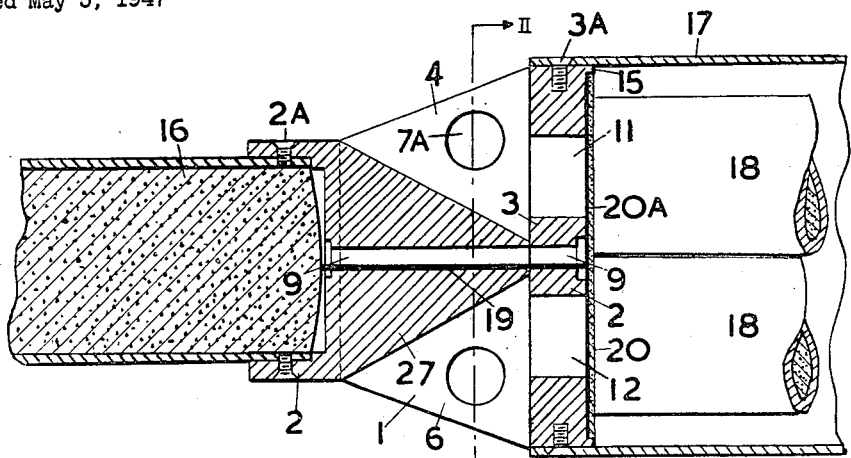
Figure 2:
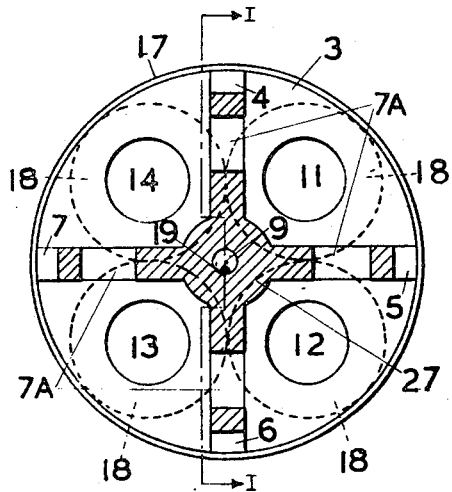
Figure 3:
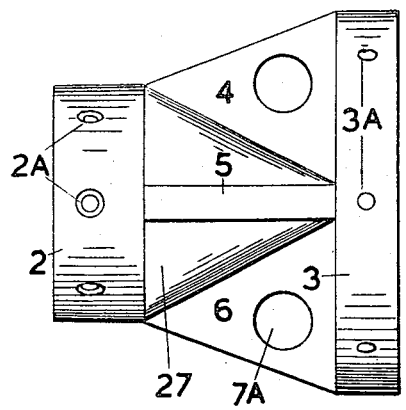
Figure 4:
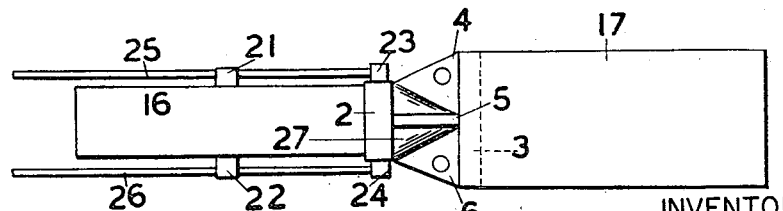
Figure 5:
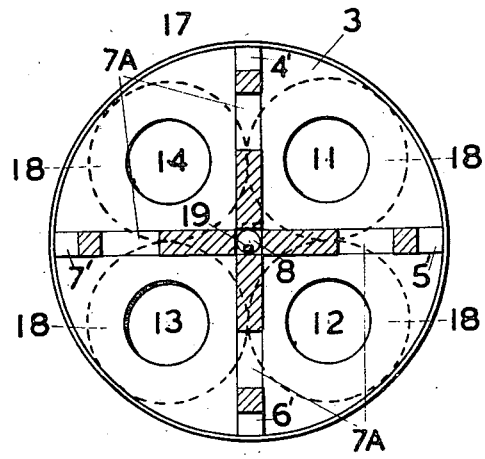
Figure 6:
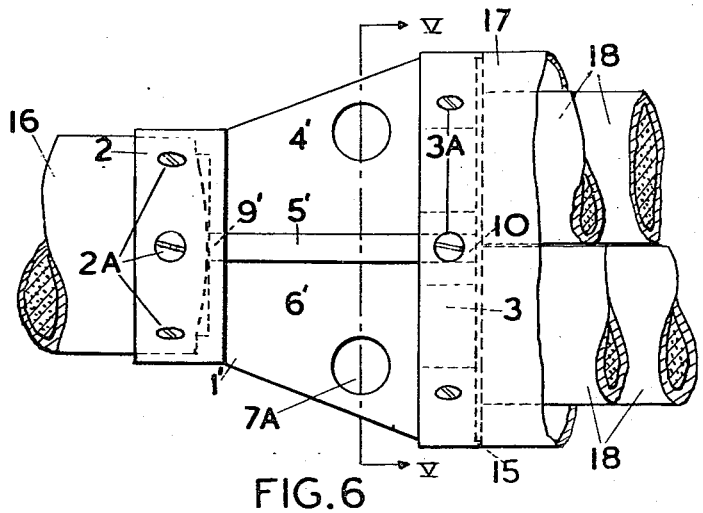

The invention will hereinafter be described, by way of example, with reference to the accompanying drawings in which Figures 1 to 4 show a preferred embodiment of the invention, Figure 1 showing a section on the line I—I, Figure 2; Figure 2 showing a section on the line II—II, Figure 1; Figure 3 showing in elevation the intermediate member which unites the rocket units and Figure 4 showing in elevation the complete rocket device with means thereon for making an attachment to an article desired to be carried by the said rockets. Figures 5 and 6 show a modification of the invention, Figure 5 showing a section taken on the line V—V, Figure 6; and Figure 6 showing in elevation the intermediate member assembled to the rocket units.

Referring to Figures 1 to 4 the intermediate member for uniting the rocket units preferably comprises a metal casting 1 in the form of a circular disc 3 and a sleeve 2, united by webs 4, 5, 6 and 7 and a conical shaped portion 21, the said sleeve, disc, webs and conical portion being formed from one piece of material. Through the centre of the casting and extending from the sleeve 2 to the disc 3 is a hole 9. The webs 4, 5, 6 and 7 are also provided with holes 7A in order to reduce the weight of the casting. The disc 3 is also provided with a number of openings 11, 12, 13 and 14 which openings are temporarily closed with fabric or paper 20A. The edge of the disc is formed into a flange 15. In the recess in disc 3 formed by flange 15 is a wad or layer of gunpowder 20. Suitably secured to the sleeve, for example, by means of screws 2A, is a rocket 16 of any desired type, the said rocket being adapted to be placed in a pistol or gun and fired therefrom. Suitably secured to the periphery of the disc 3, for example, by means of screws 3A, is a casing 17 within which are secured a number of rockets 18; in the present instance four such rockets are shown in the drawing. Each of the rockets 18 is arranged axially with one of the openings 11, 12, 13 or 14 provided in the said disc 3.

In the modification of the invention shown in Figures 5 and 6, the conical portion 21 of the intermediate member 1 in Figures 1 to 4 is dispensed with the intermediate member $1^1$, preferably a metal casting comprising a circular disc 3 and a sleeve 2 united by webs $4^1$, $5^1$, $6^1$, and $7^1$, a space 8 being formed between the said webs. The sleeve 2 is provided with a central opening $9^1$ coinciding with the space 8 and the disc 3 is also provided with a similar opening 10 axial therewith.

The operation of the two forms of the invention described is similar. The device is placed in a suitable discharger and fired therefrom. The operation of firing ignites the charge in the rocket 16 and the gases therefrom propel the device through the air in the well known manner. When the charge in the rocket 16 is nearly exhausted the flame therefrom will pass through the hole 9, Figures 1 to 4, or through the opening $9^1$ in the sleeve 2, the space 8, and the opening 10 in the disc 3, Figures 5 and 6 to ignite the wad or layer of gunpowder 20 provided on the paper or fabric 20A or face of the disc 3 within the recess formed by the flange 15. In order to ensure the ignition of the wad or layer of gunpowder 20 a fuse 19 may be provided which extends from the rocket 16 through the hole 9, Figures 1 to 4, or through the opening $9^1$ in the sleeve, space 8, and hole 10 in the disc, Figures 5 and 6, to the layer or wad of gunpowder. As soon as the wad or layer of gunpowder 20 is ignited it will ignite the charge in each of the rockets in the casing 17 which rockets will then take over the propulsion of the device. The gases therefrom issue from the holes in the disc 3. In the arrangement shown in Figures 1 to 4 the gases will be deflected by means of the cone-shaped portion 27 of the casting 1 thereby assisting in stabilising the rocket.

If desired, a number of cases provided with rockets may be secured to the casing 17 and fired in the same manner as this casing is secured to the rocket 16, so that, provided the balance and construction of the device is efficient the arrangement will provide a rocket having a range many times in excess of rockets hitherto used. Furthermore, any desired number of rockets may be secured within the casing 17, each rocket having a corresponding opening in the disc 3 through which the gases therefrom may issue.

The device hereinbefore described is eminently suitable for use as a line throwing rocket in which case it is preferred to attach the line by means of the arrangements described and claimed in British specification No. 503,325, corresponding to U. S. Patent No. 2,210,820, dated August 6, 1940, but it will be understood that any other convenient means may be used for attachment. In order to secure the article to be carried by the rockets, lugs 21 and 22 are formed on the rocket casing 16 and lugs 23 and 24 are formed on the casing 1 as shown in Figure 4. The lugs 21 and 22 are provided with plain holes and the lugs 23 and 24 are threaded so that rods 25 and 26 may be passed through the lugs 21 and 22 and screwed into the lugs 23 and 24; these rods may correspond to those shown and described in the aforesaid specification No. 503,325. Furthermore, it will be understood that the rocket may be used for purposes other than for line throwing.

What we claim is:

1. A rocket device comprising a single rocket adapted to be fired from a gun, a plurality of additional rockets arranged forwardly of the single rocket and an intermediate member by which the plurality of rockets is secured to the single rocket, the said intermediate member comprising a sleeve and a disc, the sleeve being secured to the single rocket and having a central aperture and the disc being secured to the plurality of rockets and having a central aperture and also a number of further apertures corresponding to the number of additional rockets, the sleeve and disc being secured to each other by suitable webs in which is provided a passage connecting the central apertures in the sleeve and disc.

2. A rocket device as claimed in claim 1, wherein a conical surface is provided between the sleeve and disc, the base of the cone being towards the sleeve.

3. A rocket device as claimed in claim 1, in which the intermediate member is cast in one piece.

4. A rocket device as claimed in claim 1, wherein the rockets are so disposed that when the single rocket is nearly exhausted, the flame therefrom passes through the central apertures of the sleeve and disc and ignites a layer of gunpowder placed on the disc, which layer in turn ignites the plurality of rockets.

5. A rocket device as claimed in claim 4, wherein the rear ends of the plurality of rockets rest against the layer of gunpowder.

6. A rocket device as claimed in claim 1, wherein a fuse is provided which extends from the single rocket, through the apertures in the sleeve and disc, to the plurality of rockets.

7. A rocket device as claimed in claim 1, wherein a plurality of further rockets is secured by means of a similar intermediate member to the forward end of the plurality of additional rockets.

8. A rocket device as claimed in claim 1, wherein a line is attached to the single rocket.

9. A rocket device as claimed in claim 1, wherein portions of the webs of the intermediate member are cut away to reduce the weight of the same.

CONRAD DAVID SCHERMULY.
ALFRED JAMES SCHERMULY.
CHARLES SCHERMULY.

REFERENCES CITED

The following references are of record in the file of this patent:

UNITED STATES PATENTS

| Number | Name | Date |
|---|---|---|
| 479,738 | Cunningham | July 26, 1892 |

FOREIGN PATENTS

| Number | Country | Date |
|---|---|---|
| 5,099 | Great Britain | Dec. 12, 1878 |
| 503,006 | France | Mar. 6, 1920 |